(No Model.)
H. V. WYSONG.
NUT LOCK.
No. 326,927. Patented Sept. 22, 1885.
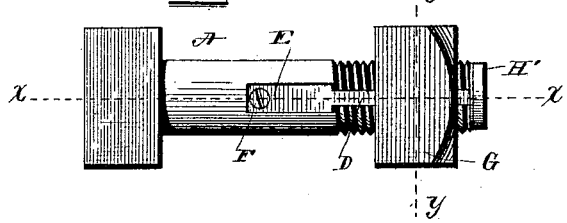
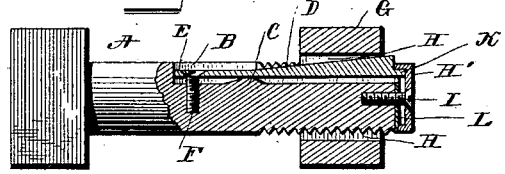
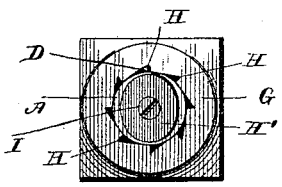 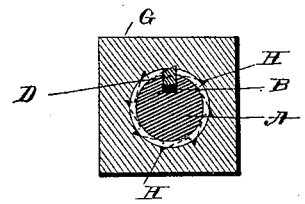
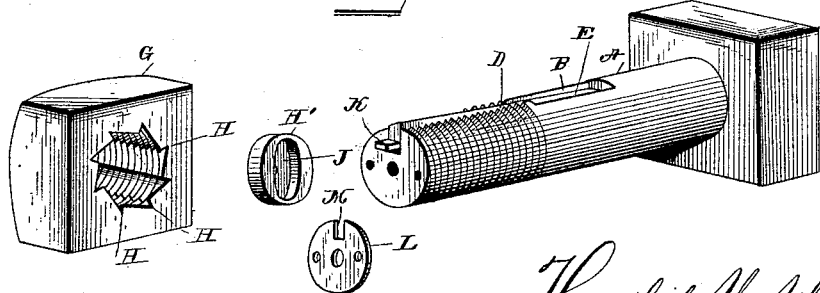
WITNESSES
F. L. Ourand
J. Fred. Reily
Herschel V. Wysong
INVENTOR
By Louis Bagger & Co.
Attorneys.

UNITED STATES PATENT OFFICE.

HERSCHEL V. WYSONG, OF WINCHESTER, INDIANA.

NUT-LOCK.

SPECIFICATION forming part of Letters Patent No. 326,927, dated September 22, 1885.

Application filed July 18, 1885. (No model.)

*To all whom it may concern:*

Be it known that I, HERSCHEL V. WYSONG, a citizen of the United States, and a resident of Winchester, in the county of Randolph and State of Indiana, have invented certain new and useful Improvements in Nut-Locks; and I do hereby declare that the following is a full, clear, and exact description of the invention which will enable others skilled in the art to which it appertains to make and use the same, reference being had to the accompanying drawings, which form a part of this specification, and in which—

Figure 1 is a side view of my improved nut-locking device, showing the nut applied to the bolt in position for operation. Fig. 2 is a longitudinal sectional view taken on the line $x$ $x$ in Fig. 1. Fig. 3 is an end view of the device, showing the lock-spring engaging the notched nut. Fig. 4 is a transverse sectional view taken on the line $y$ $y$ in Fig. 1; and Fig. 5 is a detail view showing the several parts composing my improved nut-lock separated or detached from each other.
The same letters refer to the same parts in all the figures.

This invention relates to that class of nut-locks in which the nut is provided with a longitudinal groove or recess in which is arranged a suitably-constructed spring adapted to engage a series of grooves or notches formed interiorly in the nut or burr which is adapted to be adjusted upon the said bolt, and which may thereby be locked, or prevented from turning in a reverse direction; and the invention has for its object to provide the bolt with a simple, convenient, and inexpensive device, whereby the lock-spring may be drawn back into its groove or recess and there retained temporarily, out of engagement with the notches in the nut when for any reason it shall be desired to remove the latter from the bolt.

With these ends in view the invention consists in the improved construction, arrangement, and combination of parts, which will be hereinafter fully described, and particularly pointed out in the claims.

In the drawings hereto annexed, A designates a bolt, which is provided with a groove, B, extending throughout its threaded portion, as shown, and over a portion of the shank, where it may be somewhat enlarged, as will be seen in the drawings. Near the inner end of the said groove is formed a small shoulder, C.

D is a spring adapted to be fitted in the groove B, and having at its inner end an enlargement or head, E, adapted to receive a screw, F, by means of which it is fastened or secured at the inner end of the said recess. The outer end or body of the said spring is beveled on its outer side, as will be seen in the drawings, so that it will readily engage the notched nut, as will be hereinafter described; and the shoulder C near the inner end of the recess serves to force the said outer end or body of the spring automatically in a forward or outward direction, so that it will readily engage the nut.

G designates the nut, which is provided with a series of interior longitudinal beveled or ratchet grooves, H H, adapted to engage with the lock-spring D, which will thus, after the nut has been adjusted, lock it in position and prevent it from turning in a reverse direction.

H' is an elliptical or other suitably-shaped cap, which is swiveled or pivoted to the end of the bolt by means of a pin or screw, I. The under side of the said cap has an elliptical or cam-shaped recess, J, into which extends a lug or projection, K, extending from the outer end of the lock-spring D. It will be seen that by turning the said cap the walls of the cam-shaped recess will serve to force the lock-spring back into its recess and retain it there out of engagement with the nut, which may then be readily turned in a reverse direction and removed from the bolt. After the nut has been removed, or at any other time, the cap H', may be given another quarter-turn, so as to release the spring and throw it again into action.

A washer, L, having a slot, M, to accommodate the end of the lock-spring, is preferably interposed between the outer end of the bolt and the inner side of the cap H, for the purpose of enabling the latter to be easily turned.

From the foregoing description, taken in connection with the drawings hereto annexed, the operation and advantages of this invention will be readily understood without requiring any extended explanation.

The construction is simple and inexpensive; and while the nut when adjusted will be securely locked, it may, by simply giving the cap H a quarter-turn, be easily removed without injury to any of the parts, which may be used over again an indefinite number of times.

When desired, various slight changes in the construction of details may be made; and I desire it to be understood that I reserve the privilege to all such changes and modifications as may be resorted to without departing from the spirit of my invention.

Having thus described my invention, I claim and desire to secure by Letters Patent of the United States—

1. In a nut-lock, the combination, with a bolt having a longitudinal groove or recess extending throughout the entire threaded portion and a portion of the shank of said bolt, and the bottom of which is provided with a shoulder near its inner end, of a spring having a beveled outer side, said spring being secured at the inner end of said groove or recess and resting upon the said shoulder, which serves to force the outer end of the said spring outwardly, substantially as and for the purpose herein set forth.

2. In a nut-lock, the combination of the bolt having a longitudinal groove or recess, a spring secured at the inner end of said recess and having a forwardly extending lug or projection, and a cap swiveled or pivoted upon the outer end of the bolt and having an elliptical or cam-shaped recess adapted to receive and engage the lug or extension of the lock-spring, which may thereby be forced back into its recess, substantially as and for the purpose herein set forth.

3. In a nut-lock, the combination, with a bolt having a longitudinal groove or recess, of the lock-spring seated in the said recess and having a forwardly-extending lug or projection, a washer arranged upon the end of the bolt and having a slot or notch adapted to accommodate the end of the lock-spring, and the swiveled or pivoted cap, the under side of which is provided with an elliptical or cam-shaped recess adapted to receive the lug or projection at the end of the lock-spring, substantially as and for the purpose herein set forth.

4. As an improvement in nut-locks, the combination of a bolt having a longitudinal groove or recess, the lock-spring secured at the inner end of said recess and having a lug or extension, the cap swiveled or pivoted upon the end of the bolt and having an elliptical or cam-shaped recess adapted to receive the lug at the end of the lock-spring, and a nut having an interior series of longitudinal beveled or ratchet grooves adapted to engage the lock-spring, all constructed and arranged substantially as and for the purpose herein shown and specified.

In testimony that I claim the foregoing as my own I have hereunto affixed my signature in presence of two witnesses.

HERSCHEL V. WYSONG.

Witnesses:
CHARLES W. WOOLVERTON,
OLIVER E. DAVIS.